(12) United States Patent
Patel et al.

(10) Patent No.: US 11,689,038 B2
(45) Date of Patent: Jun. 27, 2023

(54) DUAL ELECTRONIC DEVICE WIRELESS CHARGER

(71) Applicant: Xentris Wireless LLC, Addison, IL (US)

(72) Inventors: Vivek Patel, Elk Grove Village, IL (US); Norikiyo I. Honda, Schaumburg, IL (US); Michael Joseph Culen, Glen Ellyn, IL (US); Jeffrey D. Bricker, Chicago, IL (US)

(73) Assignee: Xentris Wireless, LLC, Addison, IL (US)

( * ) Notice: Subject to any disclaimer, the term of this patent is extended or adjusted under 35 U.S.C. 154(b) by 0 days.

(21) Appl. No.: 17/008,059

(22) Filed: Aug. 31, 2020

(65) Prior Publication Data

US 2022/0069600 A1   Mar. 3, 2022

(51) Int. Cl.
*H02J 7/00*    (2006.01)
*H02J 7/02*    (2016.01)
*H02J 50/60*   (2016.01)

(52) U.S. Cl.
CPC .............. *H02J 7/0045* (2013.01); *H02J 7/02* (2013.01); *H02J 7/0047* (2013.01); *H02J 50/60* (2016.02)

(58) Field of Classification Search
CPC .................................................. H02J 7/0044
USPC ........................................................ 320/108
See application file for complete search history.

(56) References Cited

U.S. PATENT DOCUMENTS 9,577,467 B1 * 2/2017 Karanikos ............ H02J 7/0027
11,228,199 B2 * 1/2022 Yang .................... H02J 50/40
2018/0219400 A1 * 8/2018 Jin ......................... H02J 7/025
2020/0169110 A1 * 5/2020 Yang ...................... H02J 50/40
2020/0212689 A1 * 7/2020 Yamamoto ............ H02J 7/0027

FOREIGN PATENT DOCUMENTS

| CN | 207896708 |   | 9/2018 |
| CN | 207896708 U | * | 9/2018 |
| CN | 207896708 U |   | 9/2018 |
| CN | 208190268 |   | 12/2018 |

(Continued)

OTHER PUBLICATIONS anker.com; PowerWave+ web page (describing wireless charger product); downloaded from internet Aug. 29, 2020, from URL: https://www.anker.com/products/variant/powerwave--pad-with-watch-holder/A2570021.

(Continued)

*Primary Examiner* — Edward Tso
*Assistant Examiner* — Ahmed H Omar
(74) *Attorney, Agent, or Firm* — Brian M. Holt

(57) ABSTRACT

A dual electronic device wireless charger provided with a base with a socket configured to receive an inner charging module; the inner charging module coupled to the base by a cable; and an outer charging element of the base provided concentric around the socket. The inner charging module movable from a compact mode seated within the socket to an expanded mode displaced apart from the base. In the compact mode the dual electronic device wireless charger may wirelessly charge an electronic device via the inner charging module or the outer charging element and in the expanded mode both the inner charging module and the outer charging element may wirelessly charge separate electronic devices, simultaneously.

19 Claims, 13 Drawing Sheets

(56) References Cited

FOREIGN PATENT DOCUMENTS

| | | | |
|---|---|---|---|
| CN | 210431021 | | 4/2020 |
| CN | 210431021 U | * | 4/2020 |
| CN | 210431021 U | | 4/2020 |
| KR | 10-2016-0057278 | | 5/2016 |
| KR | 10-2016-0057278 A | | 5/2016 |

OTHER PUBLICATIONS

Bahng, Seung Hoon; International Search Report and the Written Opinion of the International Searching Authority, for PCT/US2021/040791, dated Nov. 1, 2021, Korean Intellectual Property Office, Daejeon, Republic of Korea.

Doherty, Fiona; International Preliminary Report on Patentability for PCT/US2021/040791, dated Mar. 9, 2023, The International Bureau of WIPO, Geneva, Switzerland.

* cited by examiner

DUAL ELECTRONIC DEVICE WIRELESS CHARGER

BACKGROUND

Field of the Invention

This invention relates to wireless chargers for portable electronic devices. More particularly, the invention relates to a compact wireless charger with the capability of wireless charging two separate electronic devices/charging protocols either individually or simultaneously.

Description of Related Art

Wireless magnetic inductive charging technologies enable recharging of suitably configured electronics devices without requiring mechanical interconnection via an electrical connector, significantly simplifying recharging procedures and enabling simplified/improved environmental sealing of the electronic devices.

Qi, developed by the Wireless Power Consortium, is an open interface standard that defines wireless power transfer using inductive charging over distances of up to 4 cm. Although a majority of modern portable electronic communications devices, such as cellular telephones, have adopted the Qi wireless charging standard, a significant number of smart watch accessories, such as Apple Smart Watches, require a proprietary wireless charging adapter and/or protocol. Therefore, to enable charging while the user is mobile, a user is required to carry two wireless chargers and associated power adapters/cabling and/or a wireless charger with a significantly increased size for accommodating spaced apart separate wireless charge coils.

Therefore, an object of the invention is to provide wireless charger solutions that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
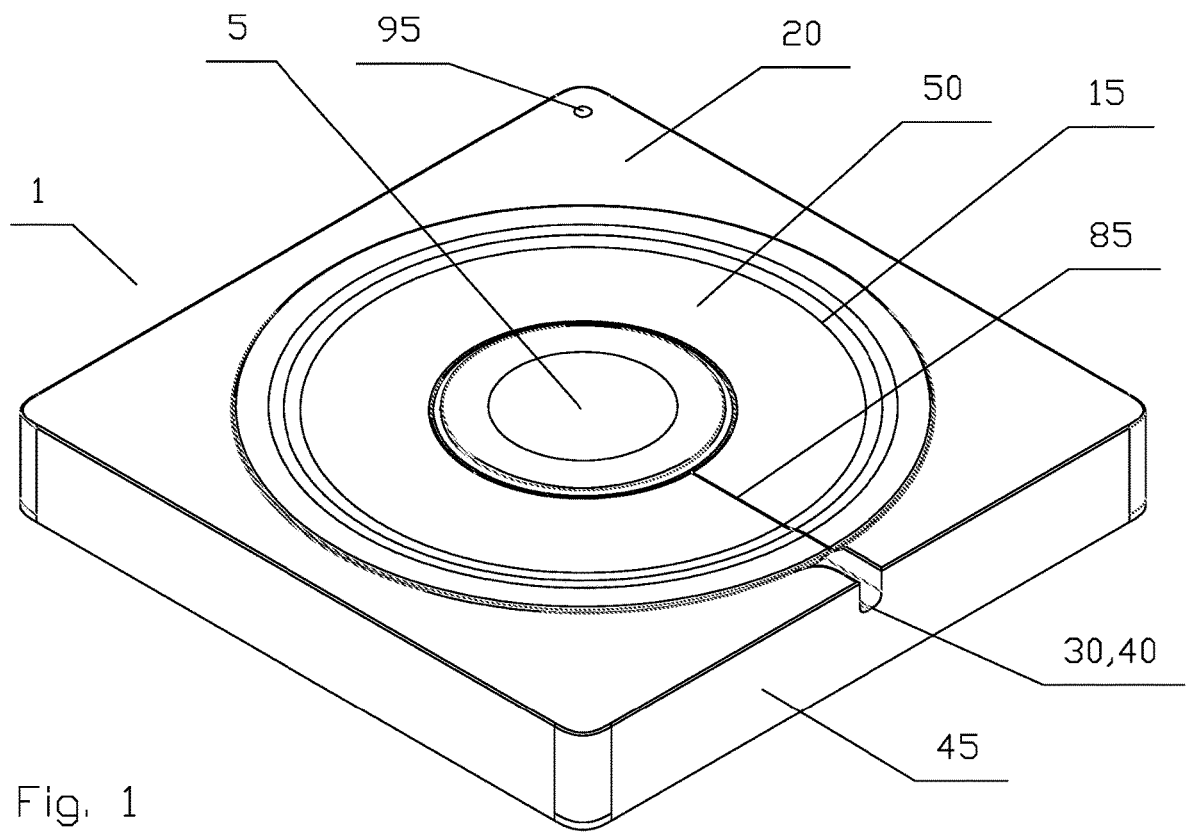
FIG. 1 is a front and top angled isometric view of an exemplary dual electronic device wireless charger, in compact mode.
Figure 2:
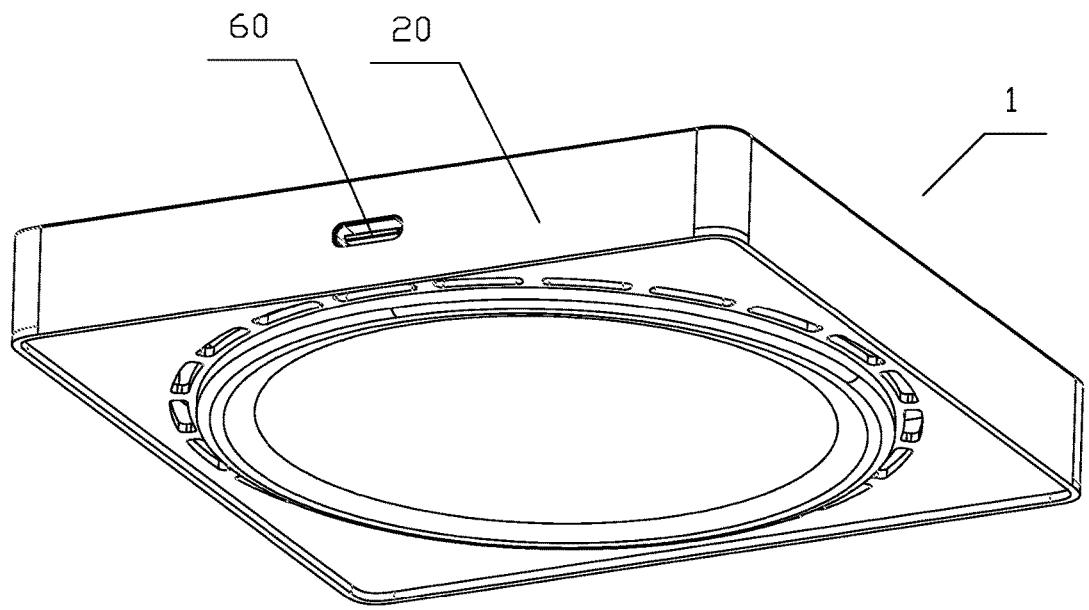
FIG. 2 is a bottom and back angled isometric view of the charger of FIG. 1.
Figure 3:
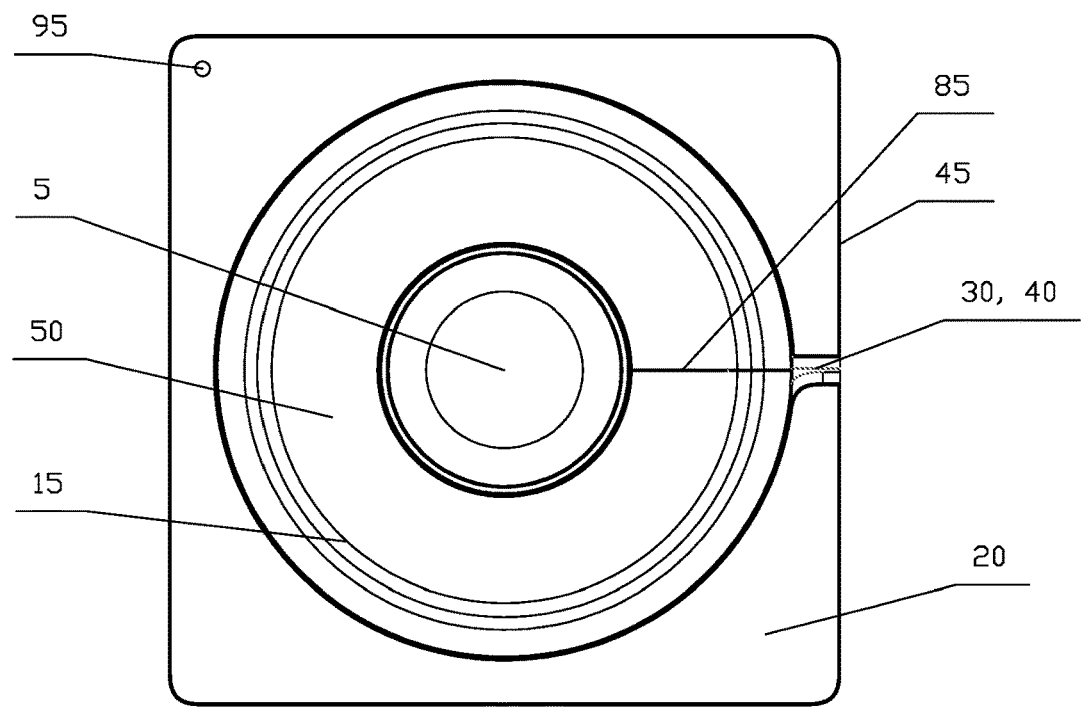
FIG. 3 is a top schematic view of the charging dock of FIG. 1.

The inventors have recognized that simultaneous operation of different wireless charging protocols, in close proximity to each other, may interfere with the correct operation of one or both charging protocols.

As best shown in FIGS. 1-4 and 8-11, a dual electronic device wireless charger 1 has an inner charging module 5 seated within a socket 10 (see FIG. 5), the socket 10 located concentrically within an outer charging element 15 in a generally planar base 20. The inner charging module 5 is electrically coupled to the electrical circuitry of the base 20 via a cable 25. The cable 25 may include, for example, multiple conductors supporting a standardized data and power conductor protocol, such as Universal Serial Bus (USB).

Figure 4:
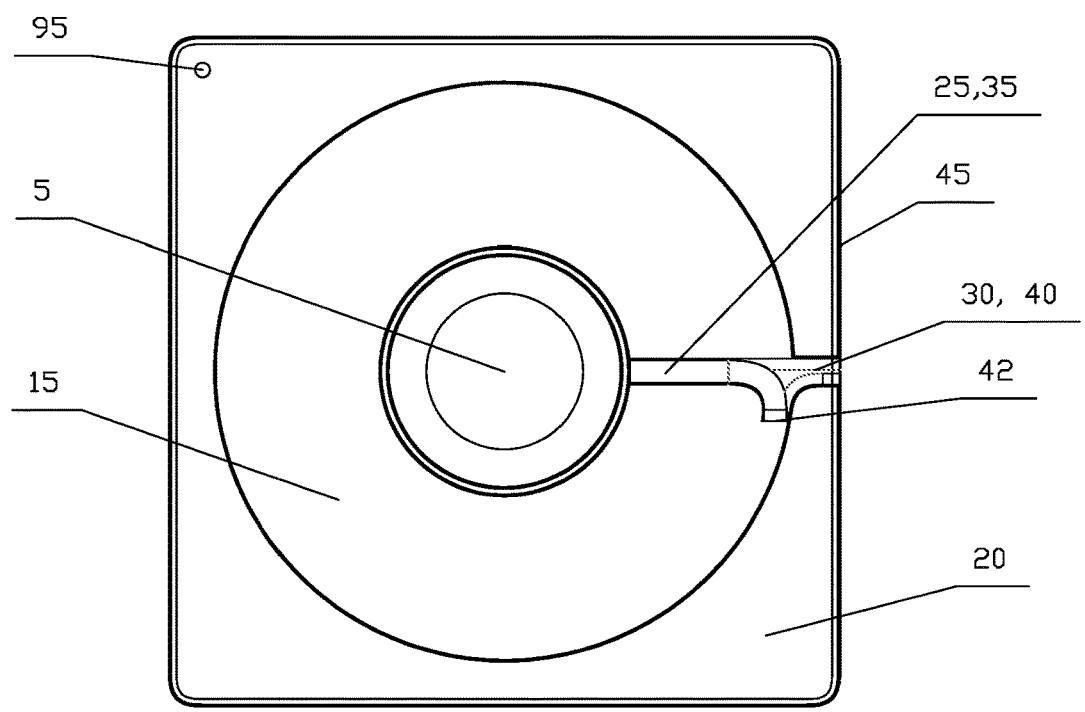
FIG. 4 is a schematic view of FIG. 3 with the cover removed.

As best shown in FIG. 4, while in a compact mode, the inner charging module 5 is seated within the socket 10 and the cable 25 is positioned within a groove 30 formed in the base 20. An inner portion 35 of the groove 30 extends from a connection point 40 of the cable 25 to the base 20 and the socket 10. An outer portion 40 of the groove 30 extends from the connection point 42 of the cable 25 to the base 20 and a periphery 45 of the base 20. The inner portion 35 of the groove 30 may be covered by a polymer cover 50 of the outer charging element 15 target area surrounding the socket 10.

Figure 5:
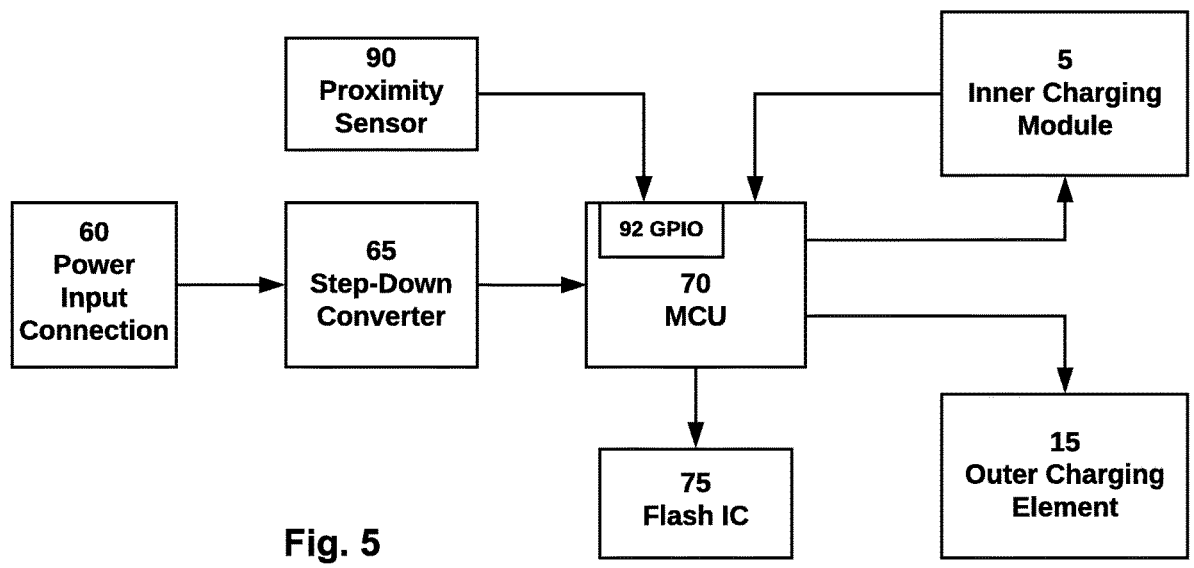
FIG. 5 is a schematic block diagram of electrical circuitry within the dual electronic device wireless charger of FIG. 1.

As shown in FIG. 5, the base 20 also contains electrical circuitry 55 including a power input connection 60, such as a USB-C connector or the like, which is electrically connected to a step-down converter 65 (if needed, depending upon the type of power provided to the power input connection 60) that powers a Microcontroller Unit (MCU) 70 configured according to logic rules stored on a Flash integrated circuit (Flash IC) 75 electrically connected to the MCU 70 for initiating, monitoring and terminating wireless charging sequences via the inner charging module 5 and/or the outer charging element 15 each according to a different desired wireless charging protocol, such as Qi and Apple Watch.

The inner charging module 5 may be a self-contained module, such as an Apple Magnetic Charging Module for the Apple Watch, available as an Original Equipment Manufacturer Charging Module from Apple Inc., Cupertino, Calif. The inner charging module 5 receives power and enablement from the MCU 70 and provides operation mode feedback to the MCU 70.

Figure 6:
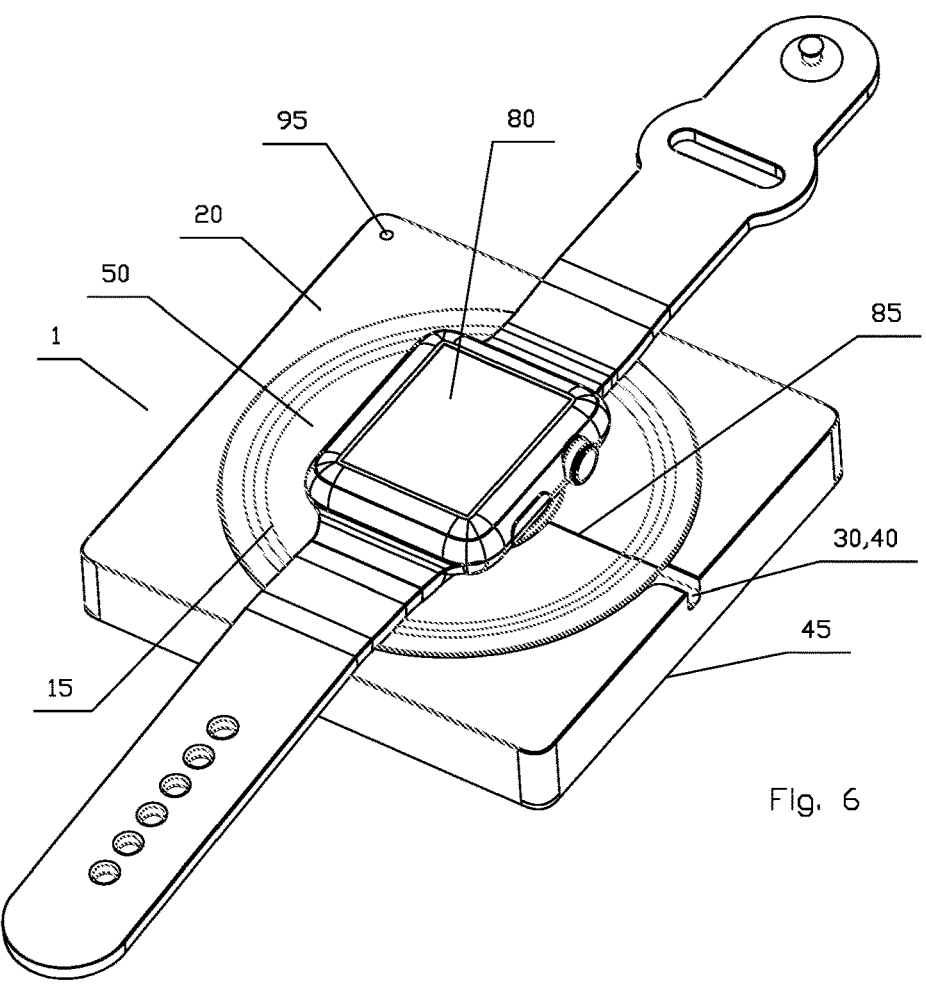
FIG. 6 is a view of the dual electronic device wireless charger of FIG. 1, demonstrating wireless charging of a smart watch while in compact mode.
Figure 7:
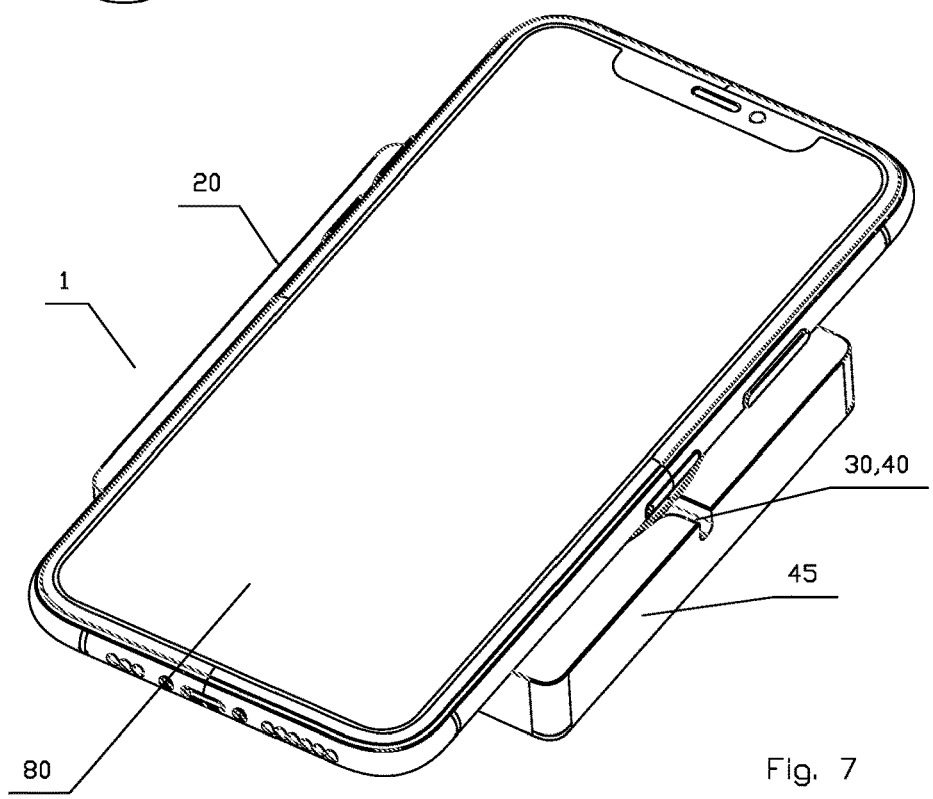
FIG. 7 is a view of the dual electronic device wireless charger of FIG. 1, demonstrating wireless charging of a cellular telephone while in compact mode.
Figure 8:
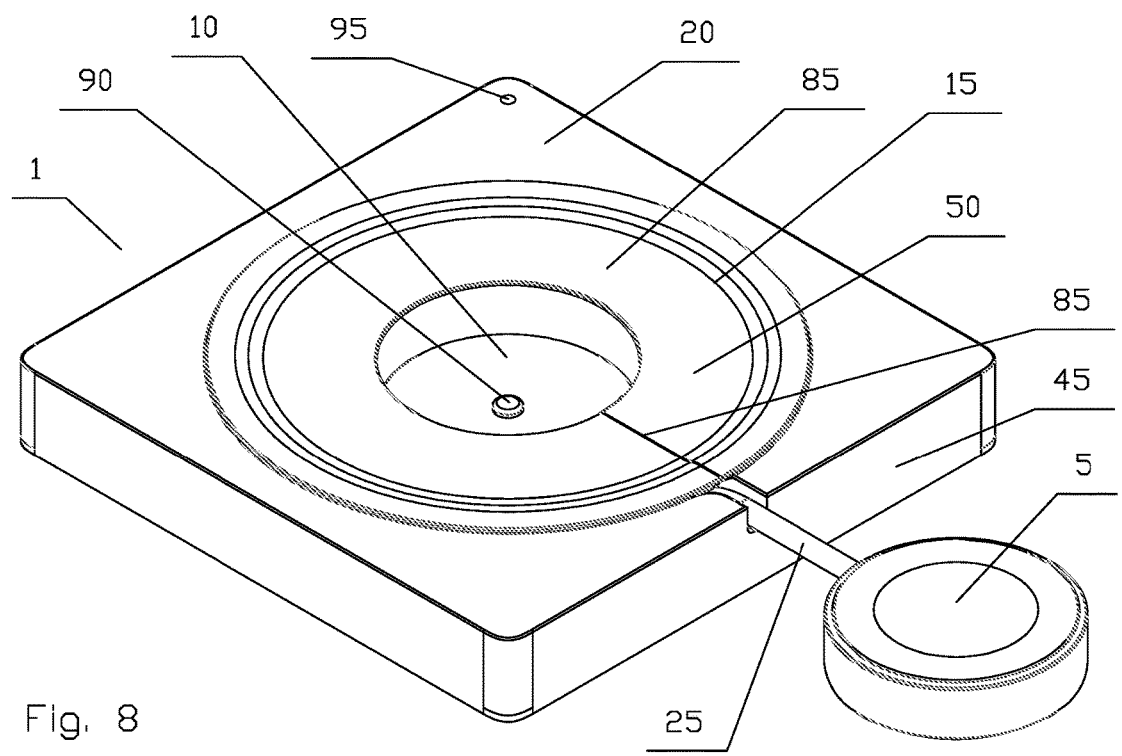
FIG. 8 is a front and top angled isometric view of the dual electronic device wireless charger of FIG. 1, in expanded mode.
Figure 9:
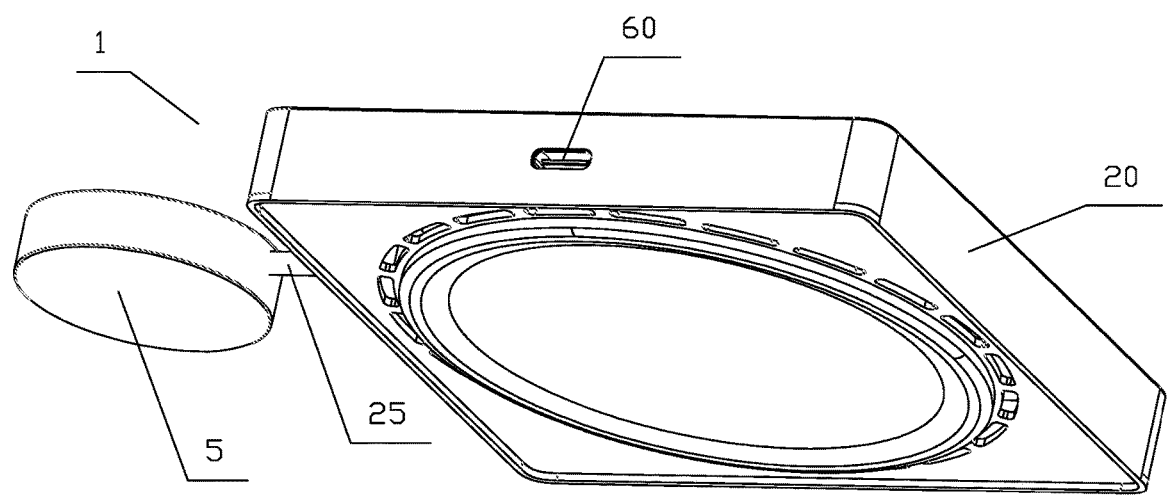
FIG. 9 is a bottom and back angled isometric view of the charger of FIG. 8.
Figure 10:
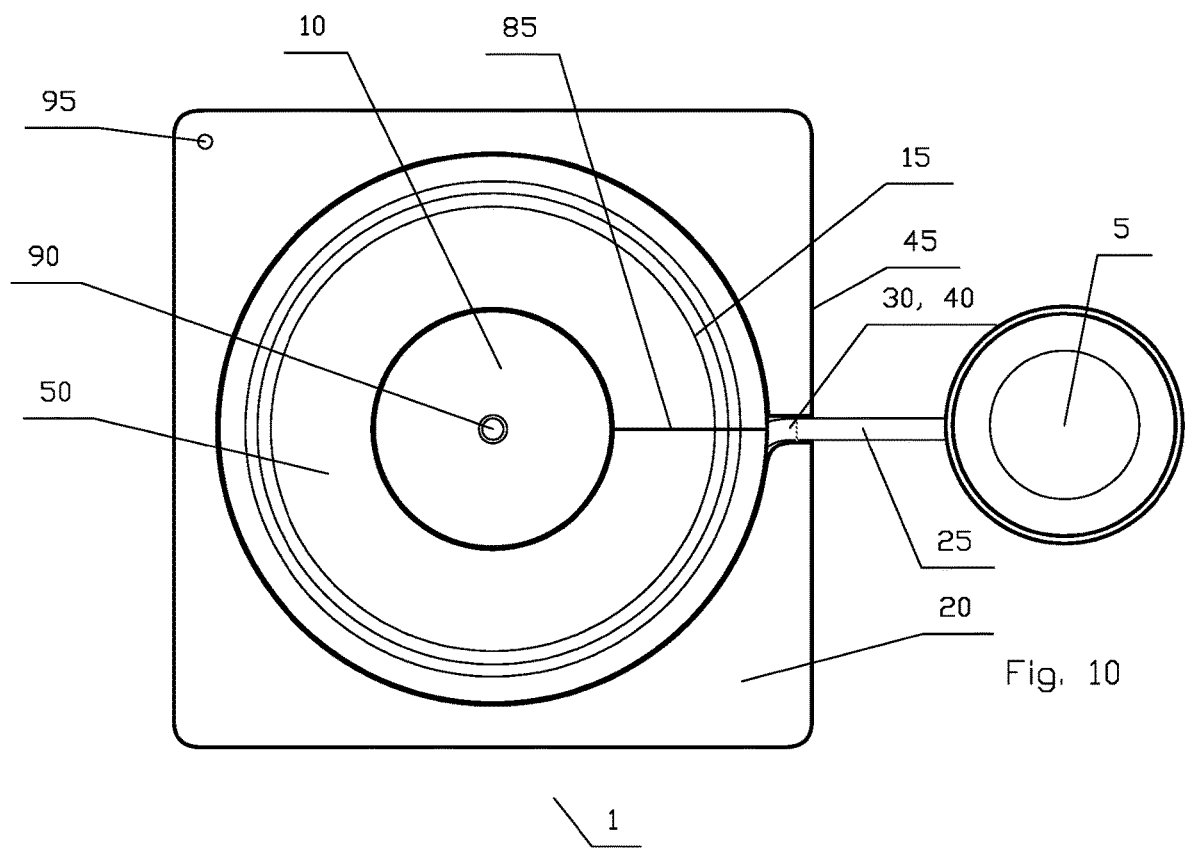
FIG. 10 is a top schematic view of the charging dock of FIG. 8.
Figure 11:
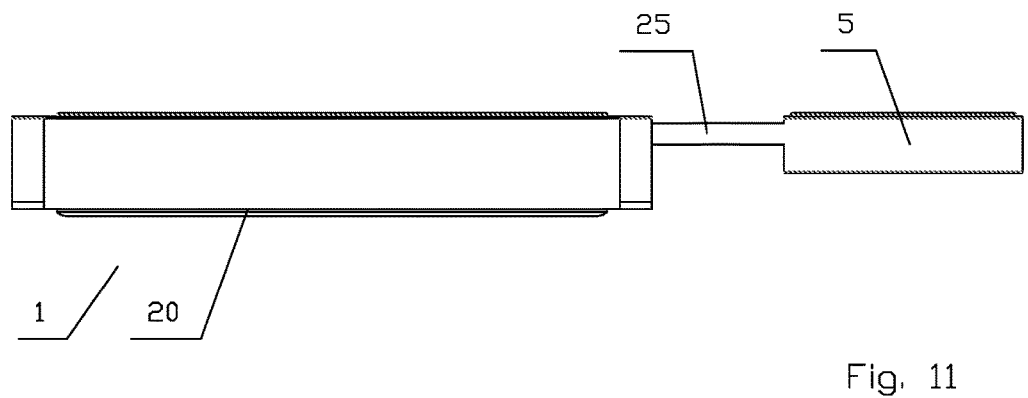
FIG. 11 is a side schematic view of the charging dock of FIG. 8.

In the compact mode, with the inner charging module 5 seated within the socket 10, to charge an electronic device 80 via either the inner charging module (such as a smartwatch) or via the outer charging element (such as a cellular telephone), the desired electronic device 80 is placed upon the base 20, over the inner charging module 5 and the outer charging element 15, for example as shown in FIGS. 6 and 7.

Figure 12:
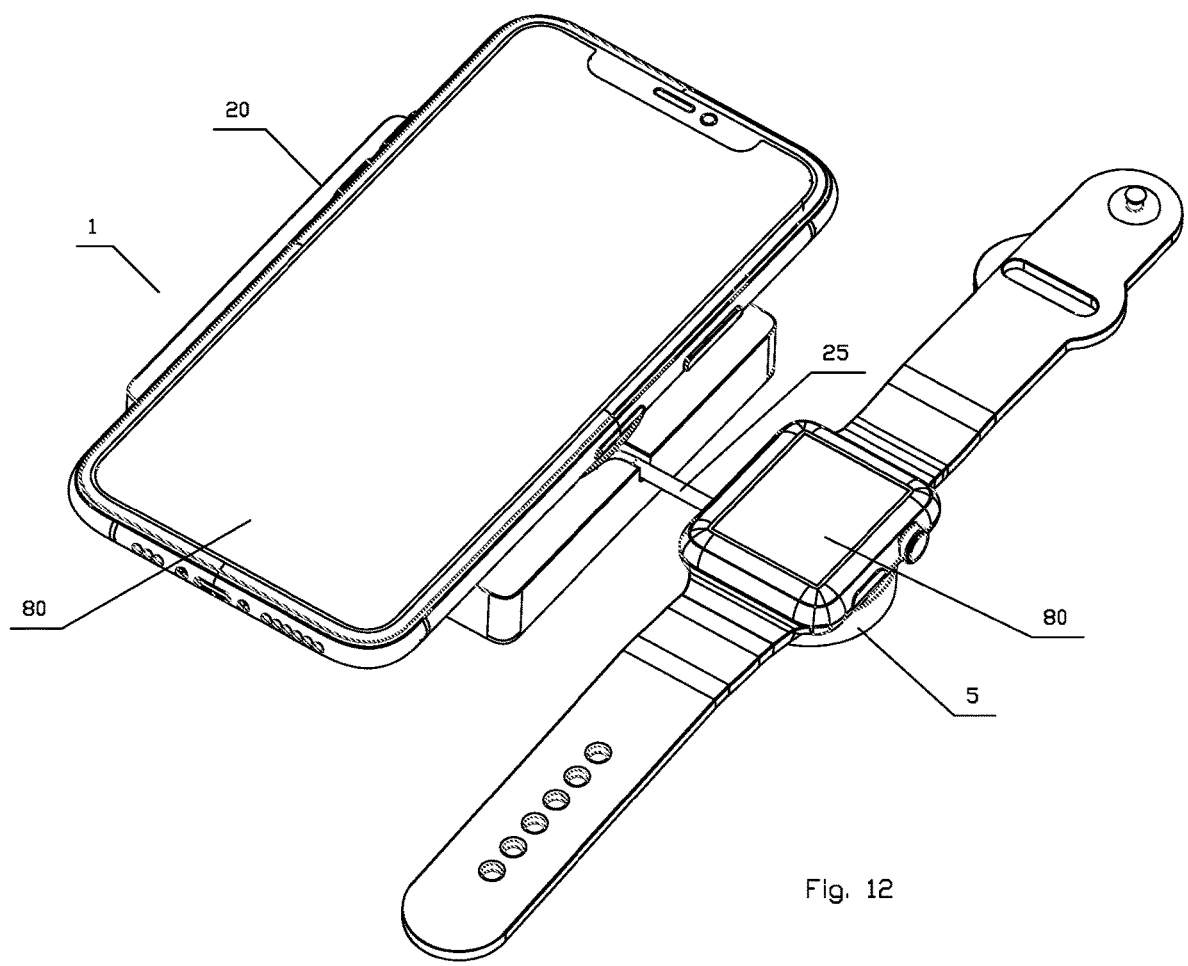
FIG. 12 is a view of the dual electronic device wireless charger of FIG. 8, demonstrating simultaneous wireless charging of a smart watch and a cellular telephone.

As shown in FIGS. 8-11, the inner charging module 5 is displaceable away from the outer charging element 15 and the base 20, into an expanded mode dual charging configuration, to enable simultaneous charging of both a first and a second electronic device 80, such as a cellular telephone and a smartwatch, as shown for example in FIG. 12. To enter the expanded mode, the inner charging module 5 is displaced away from the base 20. As the inner charging module 5 is removed from the socket 10, the cable 25 may be pulled through a slit 85 of the cover 50 (see FIGS. 1 and 3) provided above the inner portion 35 of the groove 30. With the inner charging module 5 removed from the socket 10 and the cable 25 repositioned out of the inner portion 35 of the groove 30 and into the outer portion 40 of the groove 30, the inner charging module 5 may be placed into the expanded mode dual charging configuration, where the inner charging module 5 is positioned spaced away from the base 20, while still electrically coupled to the electrical circuitry 55 of the base 20 via the cable 25.

To prevent interference between charging protocols, the dual electronic device wireless charger 1 detects whether or not the inner charging module 5 is present within the socket 10, for example via a proximity sensor 90 such as a spring switch (see FIGS. 8 and 10), or the like that is coupled to the MCU 70, for example via a General Purpose Input Output (GPIO) port 92 of the MCU 70. If the inner charging module 5 is not detected within the socket 10, a dual charging mode is enabled wherein the inner charging module 5 and the outer charging element 15 are both enabled for charging via their respective wireless charge protocols.

Simplified mode visual feedback may be provided to the user via one or more light emitting diode (LED) 95 or the like, provided on the base 20. A power LED 95 may provide feedback, such as power status of the base 20. Further feedback may include, for example, where a charge session has been successfully initiated via the inner charging module 5 while located either in the socket 10 or spaced away from the base 20, or with another electronic device 80 via the outer charging element 15, a status LED 95 may be energized to emit a, for example, white (charging in progress) light feedback. Conversely, if a foreign object is detected proximate the outer charging element 15 but a charge session has not been successfully negotiated and initiated, the LED 95 may flash red (unchargeable object present).

In further embodiments, for example as shown in FIGS. 14-22, the base 20 and socket 10 may be modified such that the socket 10 is a through hole configured for insertion of the inner charging module 5 from a backside of the base 20. A flange 8 on the inner charging module 5 which keys with a step of the socket 10 prevents the inner charging module 5 from passing all of the way through. A releasable retention of the inner charging module 5 within the socket 10 may be provided by, for example, magnets 12 or the like. Further to the backside seating of the inner charging module 5 into the socket 10, the cable 25 seats within a groove 30 also provided in the backside of the base 20. To provide additional cable 25 extent for spacing the inner charging module 5 and base 20 farther apart when in the expanded mode, the groove 30 may be provided with serpentine bends or the like. A fit between the groove 30 and the cable 25 may be an interference fit to retain the cable 25 within the groove 30 while in compact mode. In this embodiment, the proximity sensor 90 may be provided proximate the socket 10 within the base 20 as a magnetic sensor such as a Hall effect sensor.

Figure 13:
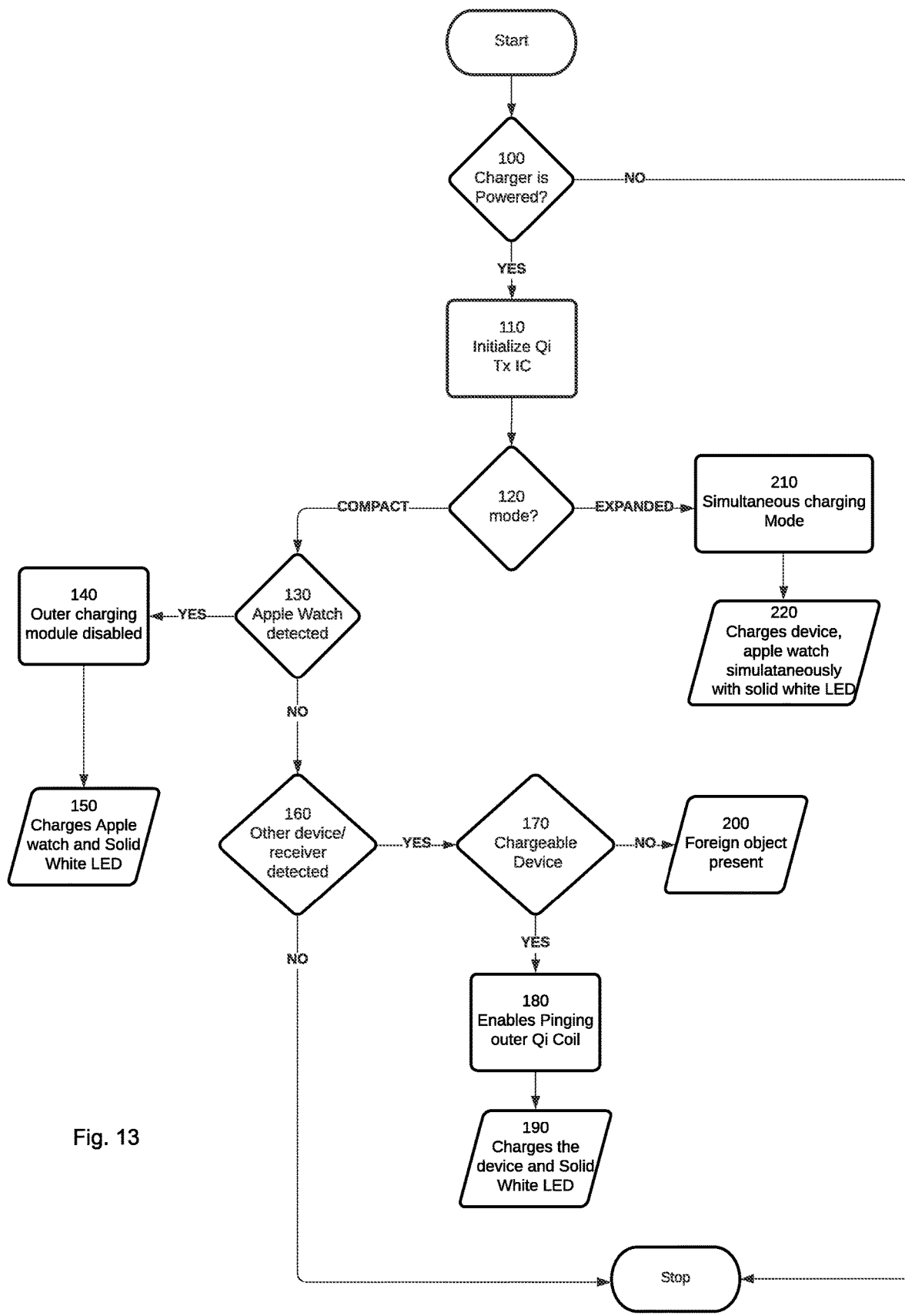
FIG. 13 is a logic flow chart, demonstrating exemplary operational logic of the dual electronic device wireless charger of FIG. 1.
Figure 14:
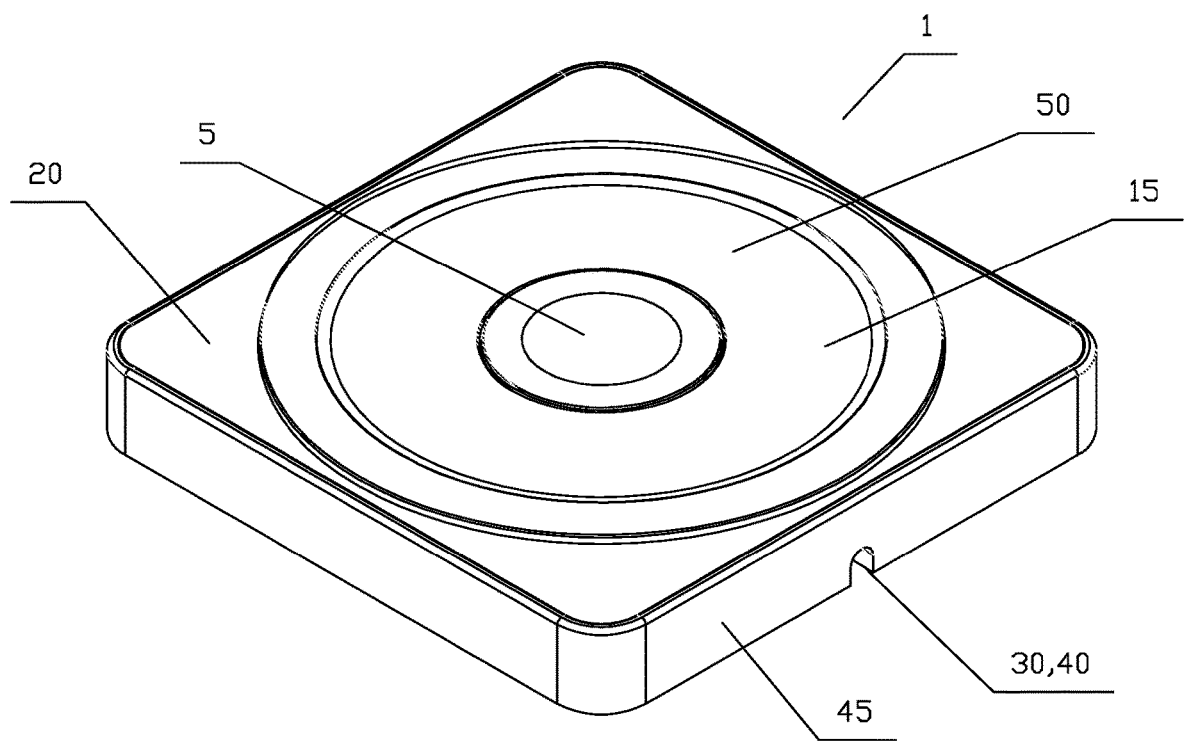
FIG. 14 is a front and top angled isometric view of an alternative embodiment of a dual electronic device wireless charger, in compact mode.
Figure 15:
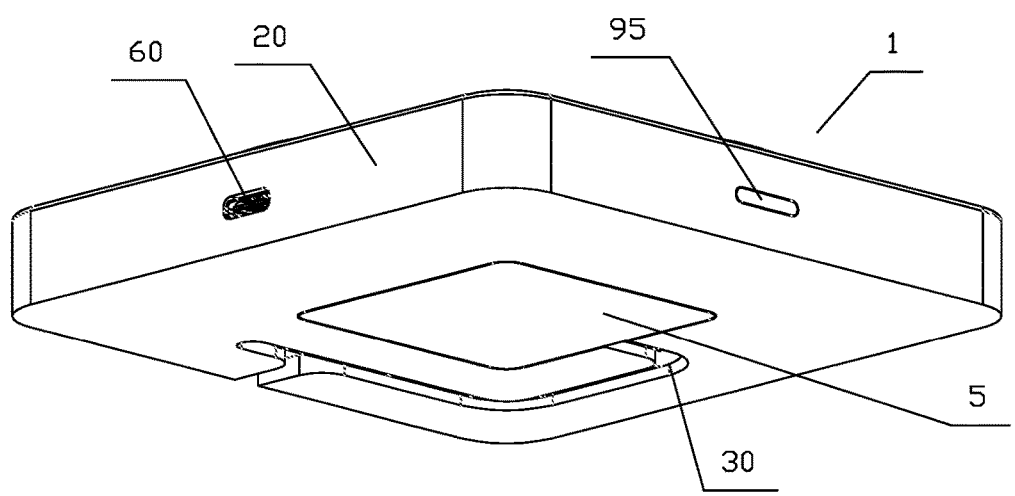
FIG. 15 is a bottom and back angled isometric view of the charger of FIG. 14.
Figure 16:
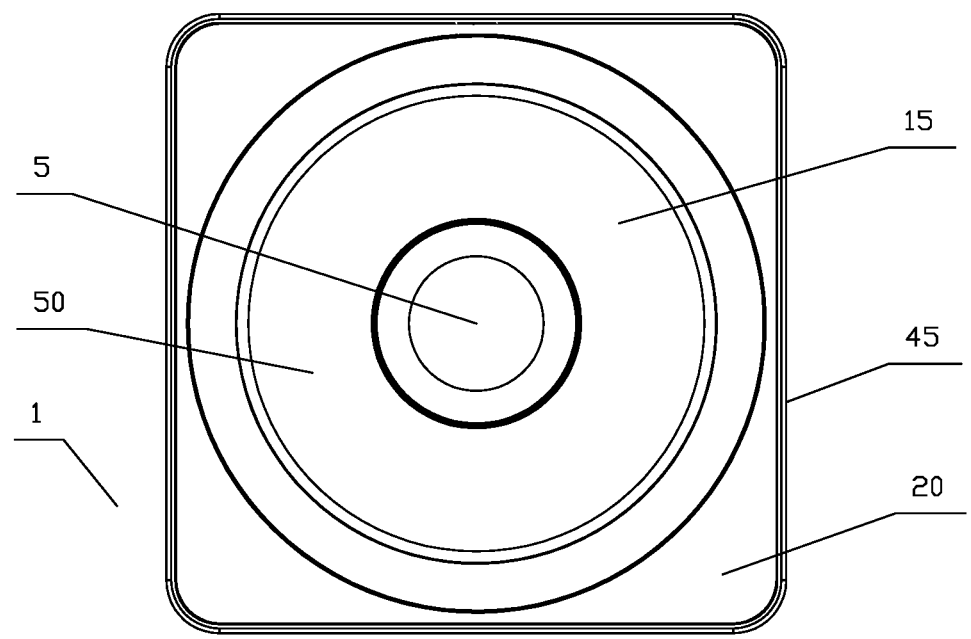
FIG. 16 is a top schematic view of the charging dock of FIG. 14.
Figure 17:
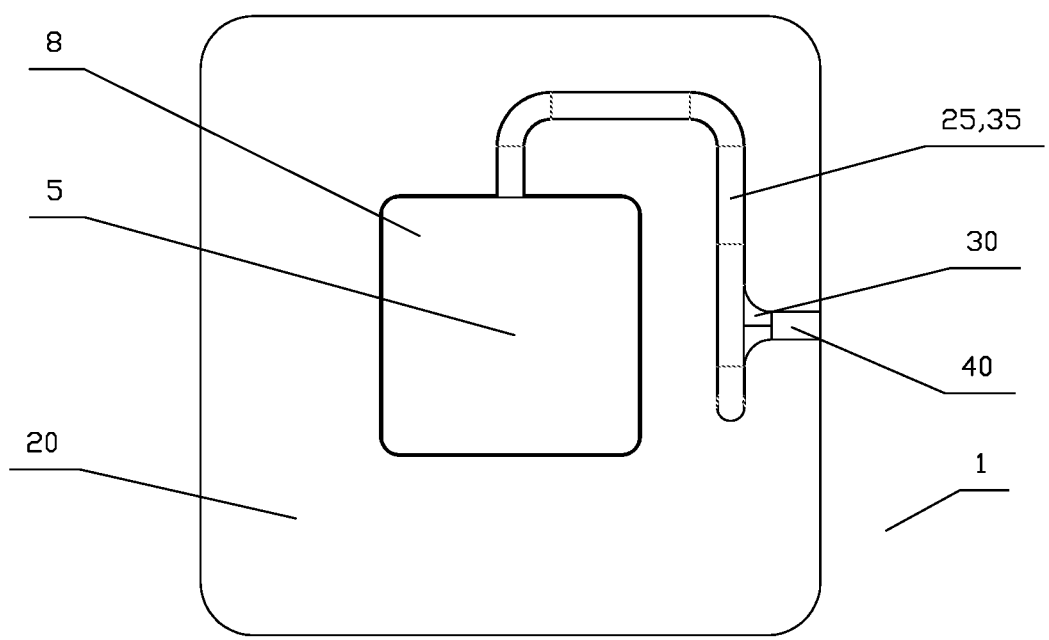
FIG. 17 is a schematic bottom view of the charging dock of FIG. 14.
Figure 18:
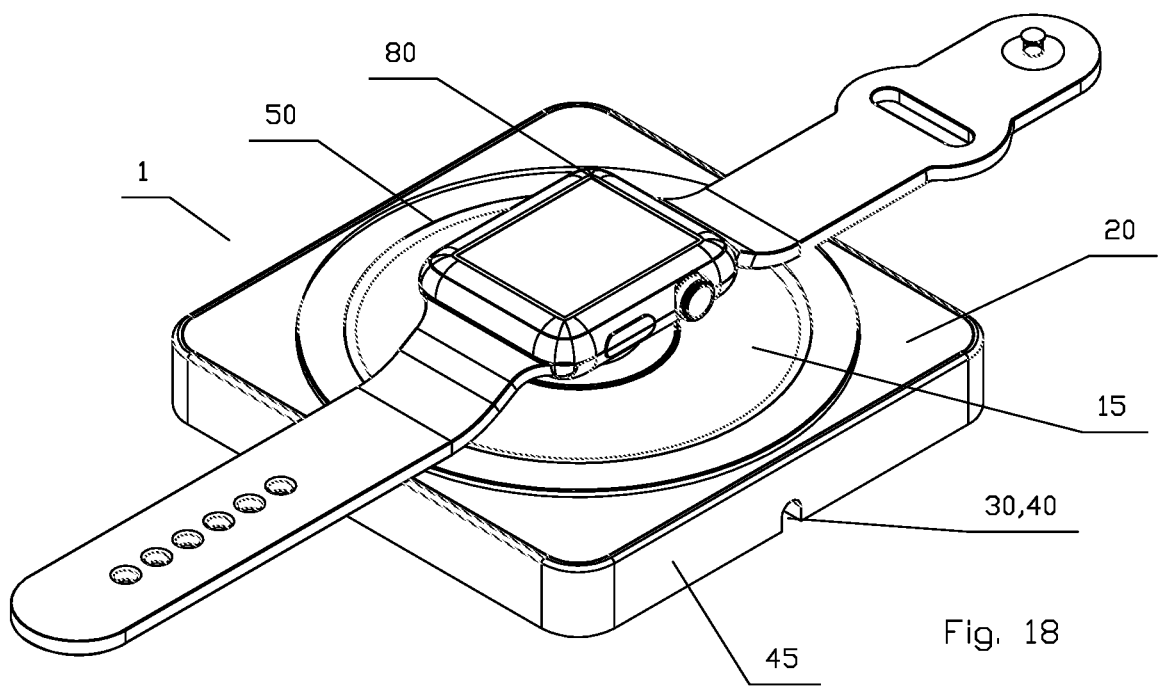
FIG. 18 is a view of the dual electronic device wireless charger of FIG. 14, demonstrating wireless charging of a smart watch while in compact mode.
Figure 19:
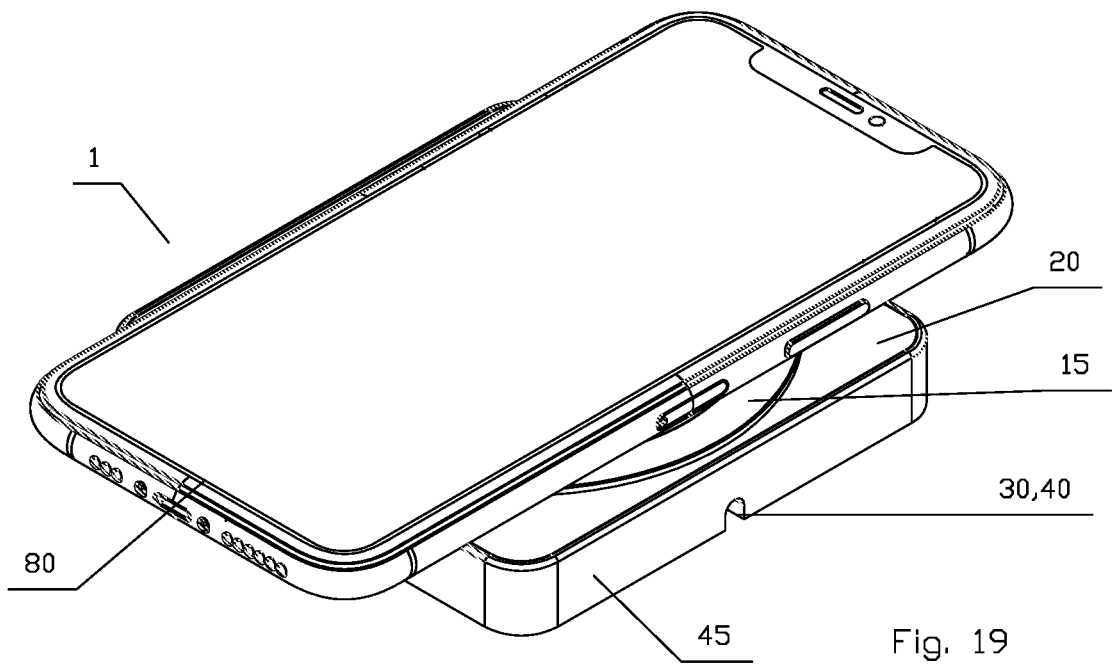
FIG. 19 is a view of the dual electronic device wireless charger of FIG. 14, demonstrating wireless charging of a cellular telephone while in compact mode.
Figure 20:
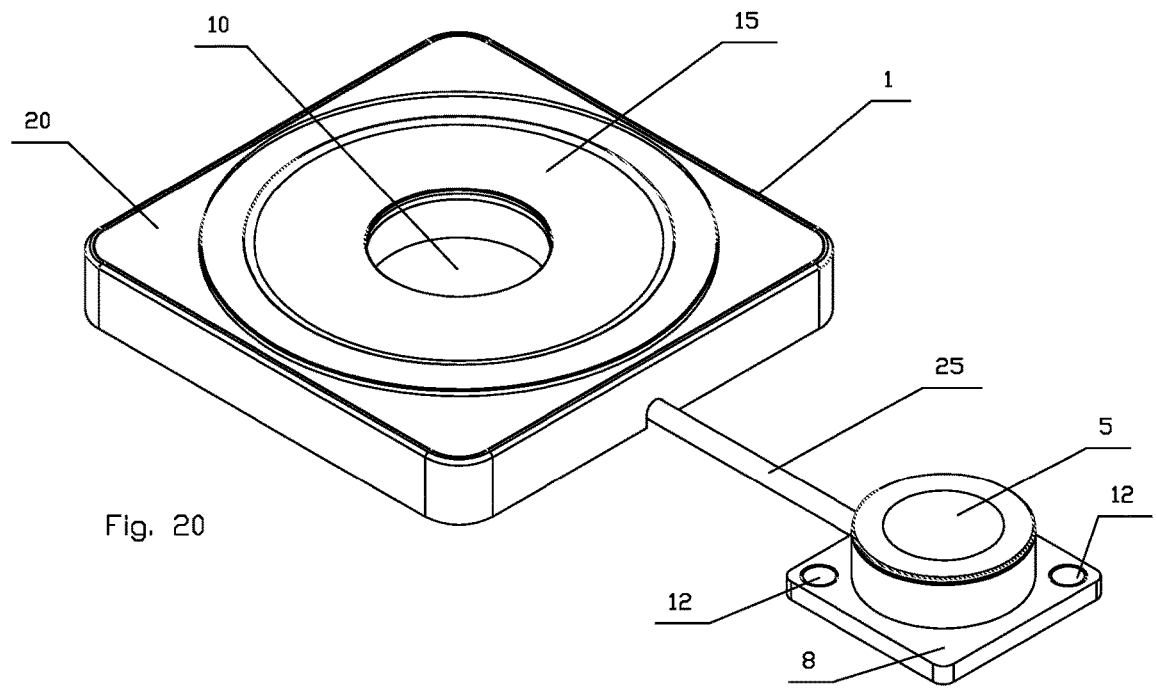
FIG. 20 is a front and top angled isometric view of the dual electronic device wireless charger of FIG. 14, in expanded mode.
Figure 21:
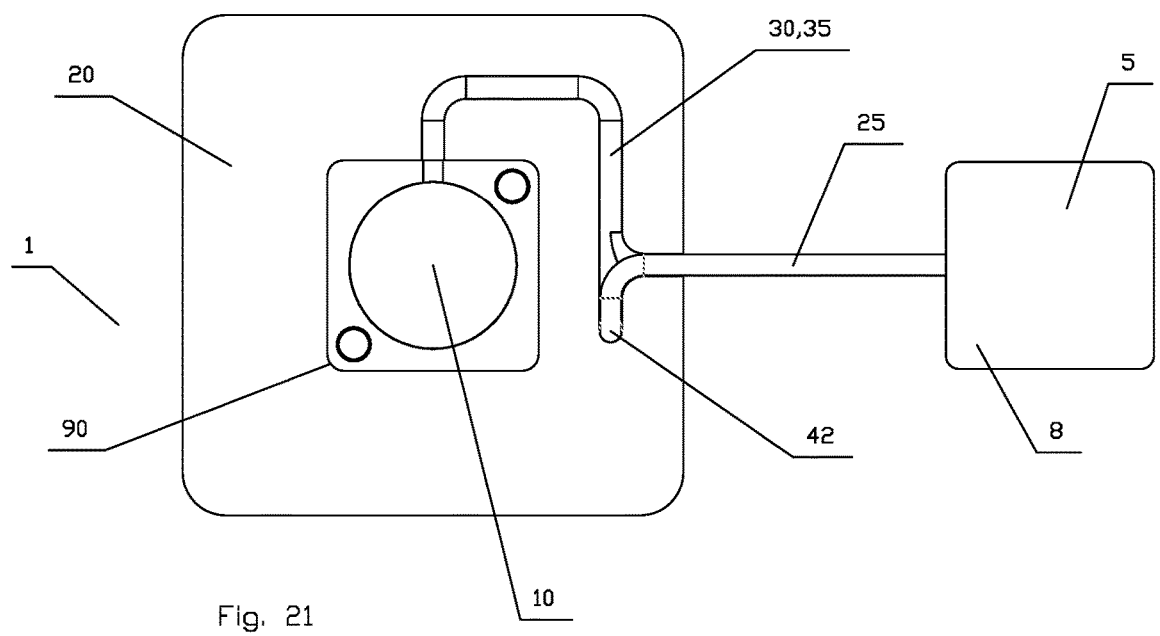
FIG. 21 is a schematic bottom view of the charger of FIG. 20.
Figure 22:
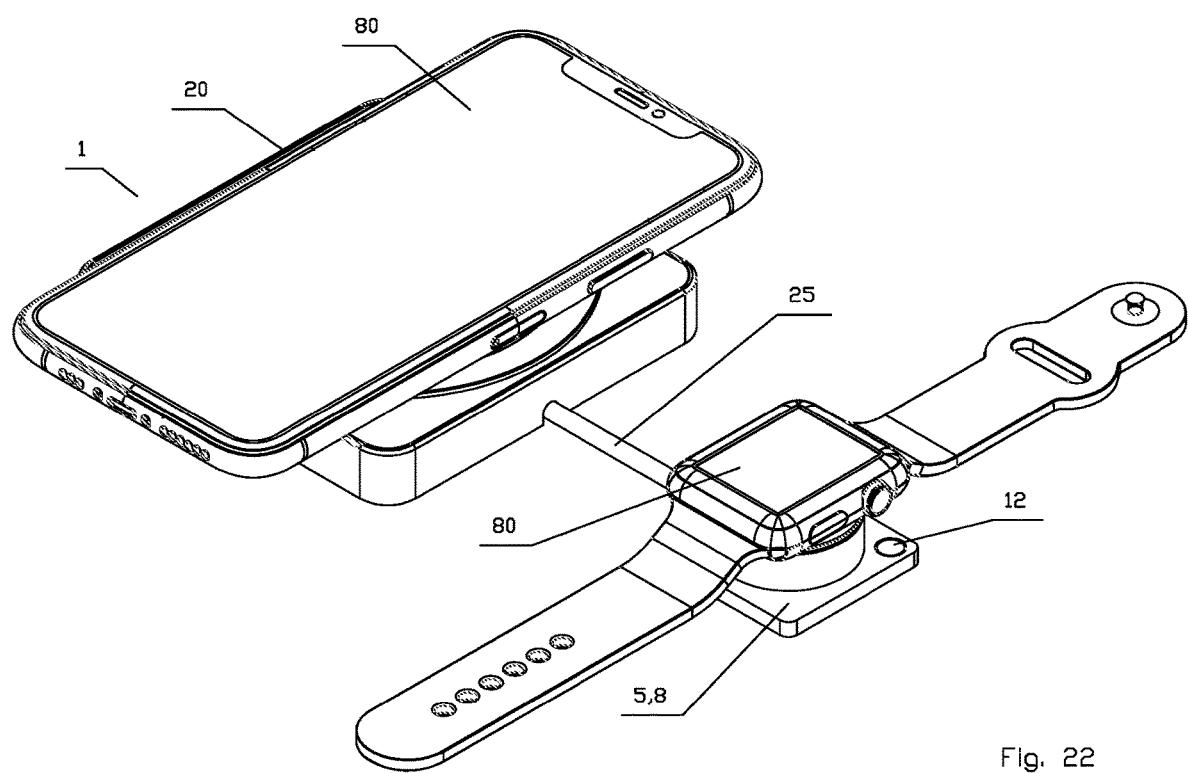
FIG. 22 is a view of the dual electronic device wireless charger of FIG. 20, demonstrating simultaneous wireless charging of a smart watch and a cellular telephone.

As shown in FIG. 13, during operation, if the charger is powered (100), a Qi mode is initialized (110) and the proximity sensor 90 state queried to determine if the charger is in compact or expanded mode (120). If the proximity sensor 90 indicates compact mode, the inner charging module 5 is queried for the presence of an Apple Watch (130). If an Apple Watch is present, the outer charging element is disabled (140) and the Apple Watch charging sequence completed while the LED 95 indicates charging in progress (150). If an Apple Watch is not present, the outer charging element 15 is sensed for the presence of an electronic device to be charged (160). If a chargeable device is detected via the outer charging element 15, a charging sequence is initiated (180) and the LED 95 indicates charging in progress (190). If an outer charging element 15 charging sequence cannot be initiated, the LED 95 may flash, for example red, to indicate a foreign object is present (200).

If, instead of compact mode, the mode query (120) indicates expanded mode, simultaneous charging via both the inner charging module 5 and the outer charging element 15 is enabled (210) and charging-in-progress is indicated by the LED 95 (220).

One skilled in the art will appreciate that the dual electronic device wireless charger 1 provides a robust but compact and simple to utilize wireless charger for multiple electronic devices 80 requiring separate wireless charging protocols simply in the same device and also simultaneously in the same device if needed, in a compact easy to use assembly requiring only a single power cord/connection.

One skilled in the art will appreciate that the dual electronic device wireless charger 1 enables a single charger to be usable with both Android-type and Apple-type devices.

| Table of Parts | |
|---|---|
| 1 | Dual electronic device wireless charger |
| 5 | Inner charging module |
| 8 | Flange |
| 10 | Socket |
| 12 | Magnet |
| 15 | Outer charging element |

-continued

Table of Parts

| | |
|---|---|
| 20 | Base |
| 25 | Cable |
| 30 | Groove |
| 35 | Inner portion |
| 40 | Outer portion |
| 42 | Connection point |
| 45 | Periphery |
| 50 | Cover |
| 55 | Electrical circuitry |
| 60 | Power input connection |
| 65 | Step-down converter |
| 70 | Microcontroller unit |
| 75 | Flash integrated circuit |
| 80 | Electronic device |
| 85 | Slit |
| 90 | Proximity sensor |
| 92 | General purpose input output port |
| 95 | Light emitting diode |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. Dual electronic device wireless charger, comprising:
   a base provided with a socket configured to receive an inner charging module;
   the inner charging module coupled to the base by a cable; and
   an outer charging element of the base provided concentric around the socket;
   the inner charging module movable from a compact mode seated within the socket to an expanded mode displaced apart from the base;
   whereby in the compact mode the dual electronic device wireless charger may wirelessly charge an electronic device via the inner charging module or the outer charging element and in the expanded mode both the inner charging module and the outer charging element may wirelessly charge separate electronic devices, simultaneously.

2. The dual electronic device wireless charger of claim 1, wherein the inner charging module and the outer charging element utilize different wireless charging protocols.

3. The dual electronic device wireless charger of claim 2, wherein a wireless charge protocol of the inner charging module is Apple Watch.

4. The dual electronic device wireless charger of claim 2, wherein a wireless charge protocol of the outer charging element is Qi.

5. The dual electronic device wireless charger of claim 1, wherein the cable is seated within an inner portion of a groove extending from a connection point of the base to the socket, while the inner charging module is seated in the socket.

6. The dual electronic device wireless charger of claim 5, further including a cover positioned above the outer charging element, a slit provided in the cover over the inner portion of the groove.

7. The dual electronic device wireless charger of claim 1, wherein the cable is seated within an outer portion of a groove extending from a connection point of the base to a periphery of the base, while the inner charging module is displaced from the socket.

8. The dual electronic device wireless charger of claim 1, further including electrical circuitry within the base;
   the electrical circuitry including a power input connection electrically coupled to a microcontroller unit, a flash integrated circuit electrically coupled to the microcontroller unit, the inner charging module electrically coupled to the micro controller unit via the cable and the outer charging element electrically coupled to the microcontroller unit.

9. The dual electronic device wireless charger of claim 8, further including a proximity sensor configured to detect a presence of the inner charging module within the socket; the proximity sensor electrically coupled to the microcontroller unit.

10. The dual electronic device wireless charger of claim 9, wherein the proximity sensor is a spring switch.

11. The dual electronic device wireless charger of claim 9, wherein the proximity sensor is a Hall effect sensor.

12. The dual electronic device wireless charger of claim 9, wherein the flash integrated circuit includes logic rules which disable the outer charging element if the inner charging module is charging an electronic device while the dual electronic device is in the compact mode.

13. The dual electronic device wireless charger of claim 1, wherein the electrical coupling of the proximity sensor with the microcontroller is via a general input-output port of the microcontroller.

14. The dual electronic device wireless charger of claim 1, wherein the socket is a through hole configured for insertion of the inner charging module from a backside of the base 20.

15. The dual electronic device wireless charger of claim 14, wherein the inner charging module is provided with a flange dimensioned to key with the socket.

16. The dual electronic device wireless charger of claim 15, wherein the flange provides a releasable retention of the inner charging module within the socket.

17. The dual electronic device wireless charger of claim 16, wherein the releasable retention is at least one magnet.

18. A method for operation of a dual electronic device wireless charger, comprising the steps of:
   applying power to the dual electronic device wireless charger of claim 1;
   initiating the compact mode if the inner charging module is detected within the socket; and
   initiating the expanded mode if the inner charging module is not detected within the socket.

19. The method of claim 14, further including the steps of:
   while in the compact mode, disabling the outer charging element if the inner charging module is charging an electronic device;

while in the compact mode, disabling the inner charging module if the outer charging element is charging an electronic device; and while in the expanded mode, enabling both the inner charging module and the outer charging module to charge an electronic device.

\* \* \* \* \*